(12) United States Patent
Takano

(10) Patent No.: US 9,921,312 B2
(45) Date of Patent: Mar. 20, 2018

(54) THREE-DIMENSIONAL MEASURING DEVICE AND THREE-DIMENSIONAL MEASURING METHOD

(71) Applicant: Panasonic Intellectual Property Management Co., Ltd., Osaka (JP)

(72) Inventor: Haruka Takano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 396 days.

(21) Appl. No.: 14/708,577

(22) Filed: May 11, 2015

(65) Prior Publication Data

US 2015/0241564 A1    Aug. 27, 2015

Related U.S. Application Data

(63) Continuation of application No. PCT/JP2013/006819, filed on Nov. 20, 2013.

(30) Foreign Application Priority Data

Dec. 20, 2012  (JP) ................................ 2012-277923

(51) Int. Cl.
*G01C 3/08*     (2006.01)
*G01S 17/89*    (2006.01)
(Continued)

(52) U.S. Cl.
CPC .............. *G01S 17/89* (2013.01); *G01S 7/484* (2013.01); *G01S 7/487* (2013.01); *G01S 7/4813* (2013.01)

(58) Field of Classification Search
CPC ........ G01S 17/89; G01S 7/4813; G01S 7/484; G01S 7/487
See application file for complete search history.

(56) References Cited

U.S. PATENT DOCUMENTS 5,831,717 A   11/1998  Ikebuchi
6,856,919 B1   2/2005  Bastian et al.
(Continued)

FOREIGN PATENT DOCUMENTS

JP   05-297139 A   11/1993
JP   05-301550 A   11/1993
(Continued)

OTHER PUBLICATIONS

International Search Report issued in International Application No. PCT/JP2013/006819 dated Jan. 14, 2014, with English translation.

*Primary Examiner* — Samantha K Abraham
(74) *Attorney, Agent, or Firm* — McDermott Will & Emery LLP

(57) ABSTRACT

In a ranging system using a TOF method, an unwanted reflected light component included in reflected light is reduced or removed. A light source unit emits light at the timing indicated by a light emission control signal and can adjust for each of at least two irradiation regions the amount of light to be emitted. A light receiving unit is exposed to light from a region including a target object and produces three-dimensional information from the total exposure amount. An image processing unit generates a distance image based on the three-dimensional information received from the light receiving unit. The light source unit emits light according to a radiation pattern indicated by a region light amount signal. The radiation pattern is setting of the amount of light to be emitted to each irradiation region.

11 Claims, 13 Drawing Sheets

(51) Int. Cl.
  *G01S 7/484* (2006.01)
  *G01S 7/487* (2006.01)
  *G01S 7/481* (2006.01)

(56) References Cited

U.S. PATENT DOCUMENTS

| | | |
|---|---|---|
| 2001/0046317 A1 | 11/2001 | Kamon et al. |
| 2006/0126054 A1 | 6/2006 | Kamon et al. |
| 2008/0231831 A1* | 9/2008 | Masuda .................. G01S 7/493 356/5.1 |
| 2013/0004060 A1* | 1/2013 | Bell ........................ G01S 17/89 382/154 |

FOREIGN PATENT DOCUMENTS

| | | |
|---|---|---|
| JP | 10-332827 A | 12/1998 |
| JP | 2001-337166 A | 12/2001 |
| JP | 2002-022426 A | 1/2002 |
| JP | 2007-139594 A | 6/2007 |
| JP | 2007-232687 A | 9/2007 |
| JP | 2012-029130 A | 2/2012 |
| JP | 2012-093189 A | 5/2012 |

* cited by examiner

FIG.2A
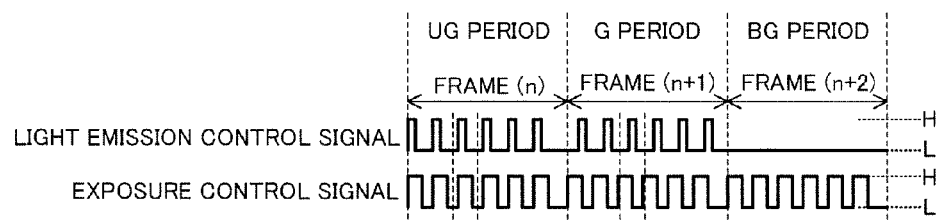
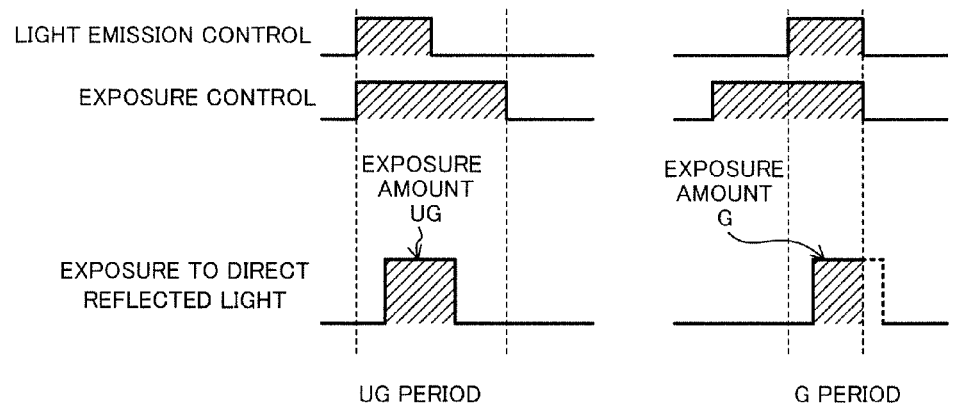
FIG.2B    FIG.2C

FIG.3A
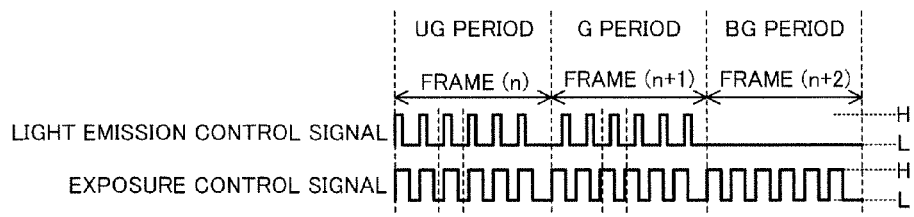
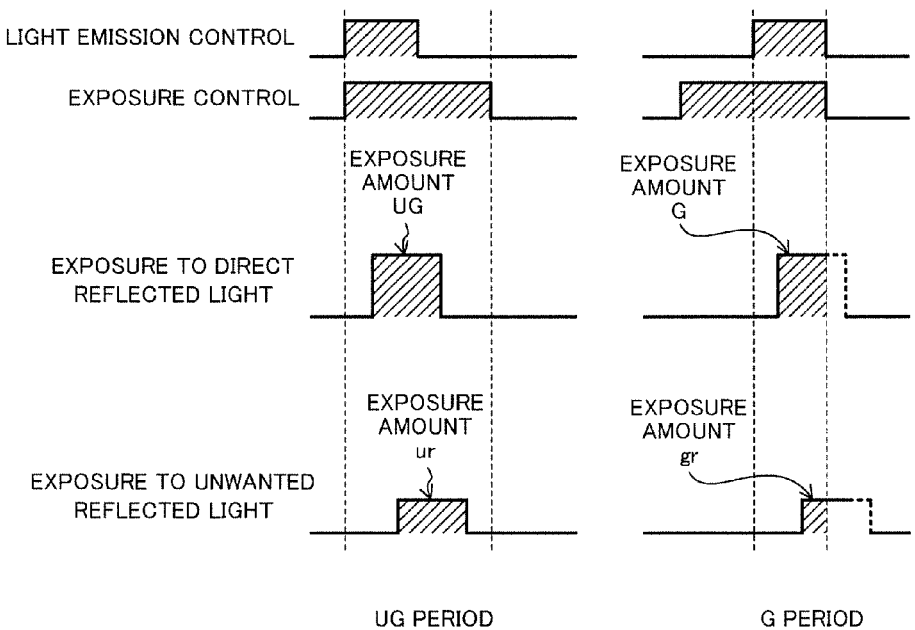
FIG.3B    FIG.3C

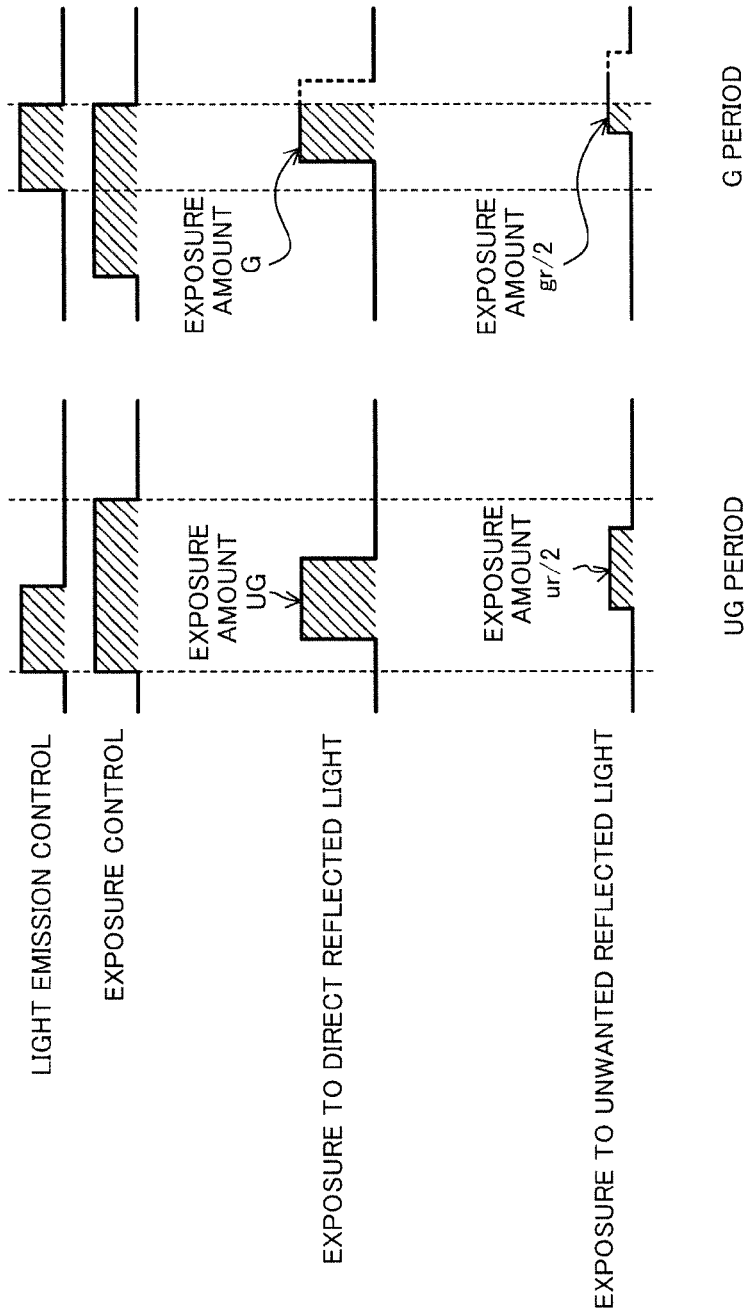

RADIATION PATTERN C

RADIATION PATTERN D

REGION LIGHT AMOUNT SIGNAL

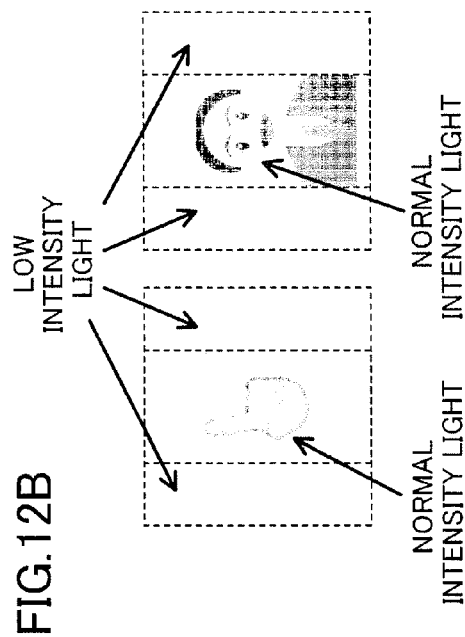
FIG.12A
FIG.12B
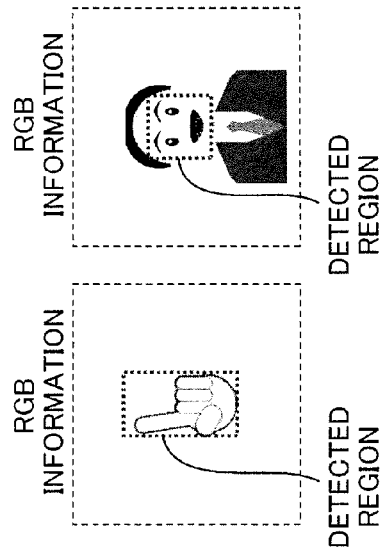
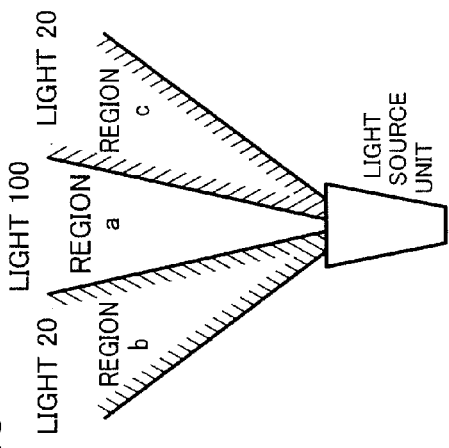
FIG.12C

THREE-DIMENSIONAL MEASURING DEVICE AND THREE-DIMENSIONAL MEASURING METHOD

CROSS-REFERENCE TO RELATED APPLICATIONS

This is a continuation of International Application No. PCT/JP2013/006819 filed on Nov. 20, 2013, which claims priority to Japanese Patent Application No. 2012-277923 filed on Dec. 20, 2012. The entire disclosures of these applications are incorporated by reference herein.

BACKGROUND

The present disclosure relates to three-dimensional measurement techniques of producing positional information of an object by emitting light and receiving its reflected light.

There is a three-dimensional measuring method based on the fact that the time of flight (TOF) from transmission of light pulses to reception of the pulses reflected from an object depends on the distance (hereinafter this method is referred to as the "TOF method"). Distance measurement (hereinafter referred to as "ranging") using the TOF method has a problem that ranging accuracy is reduced by reflectance of a target object or by the surrounding environment.

Japanese Unexamined Patent Publication No. H10-332827 describes a method that suppresses such reduction in ranging accuracy. In this method, pulsed light is repeatedly emitted at regular intervals. The amount of each reflected pulsed light is converted to a fixed value, and the resultant reflected pulsed light is allowed to enter an imaging area sensor. The exposure amount in a predetermined period is proportional to the number of reflected pulsed lights (the number of pulses). The longer the time of flight is, namely the longer the distance is, the smaller the exposure amount is. Since the amount of each reflected pulsed light is converted to the fixed value, three-dimensional measurement independent of the reflectance of the target object can be implemented.

Japanese Unexamined Patent Publication No. 2001-337166 describes another method that suppresses such reduction in ranging accuracy. In a long distance mode, light is emitted with a uniform luminous intensity distribution, and ranging is performed by using the TOF method. In a short distance mode, light is emitted with two different luminous intensity distributions, and the ratio between incident light intensities is obtained. In the short distance mode, ranging is performed by using a triangulation method. This method can implement accurate three-dimensional measurement in a larger distance range.

In the case of measuring the distance to a target object by using the TOF method, the target object is irradiated not only with direct light beams from a light source unit but also with optical multipath resulting from scattering of other direct light beams by the surrounding environment such as a wall (hereinafter the optical multipath is referred to as the "scattered light"). A light receiving unit receives not only reflection of the direct light beams (hereinafter referred to as the "direct reflected light") but also reflection of the scattered light (hereinafter referred to as the "unwanted reflected light"). In this case, the light receiving unit generates electric charge corresponding not only to the direct reflected light component but also to the unwanted reflected light component. Depending on the surrounding environment, this may significantly reduce ranging accuracy in the three-dimensional measurement of the target object.

If there is a mirror in an irradiation region, a large amount of unwanted reflected light is generated, which causes a significant measurement error in a distance image of the target object.

In Japanese Unexamined Patent Publication Nos. H10-332827 and 2001-337166, no measures are taken against the measurement error due to the influence of the unwanted reflected light, and the influence of the unwanted reflected light cannot be eliminated.

In view of the above problems, it is an object of the present disclosure to remove or reduce an unwanted reflected light component generated by the surrounding environment in three-dimensional measurement using a TOF method and implement accurate three-dimensional measurement.

SUMMARY

In one aspect of the present disclosure, a three-dimensional measuring device using a time of flight (TOF) method includes: a light source unit configured to emit light at timing indicated by a light emission control signal and to be able to adjust for each of at least two irradiation regions an amount of light to be emitted; a light receiving unit configured to be exposed to light from a region including a target object at timing indicated by an exposure control signal and to produce three-dimensional information from a total exposure amount; an image processing unit configured to generate a distance image based on the three-dimensional information received from the light receiving unit; and a control unit configured to output the light emission control signal, the exposure control signal, and a region light amount signal indicating a radiation pattern as setting of the amount of light to be emitted to each of the irradiation regions, wherein the light source unit emits light according to the radiation pattern indicated by the region light amount signal.

According to this aspect, the light source unit can adjust for each of at least two irradiation regions the amount of light to be emitted, and emits light according to the radiation pattern indicated by the region light amount signal. For example, the image processing unit can therefore eliminate the influence of the reflected light component in the light emitted to a certain irradiation region, based on the relation between the radiation pattern indicated by the region light amount signal and the three-dimensional information produced by the light receiving unit when light is emitted according to this radiation pattern. Alternatively, the control unit can output the region amount signal so as to reduce the amount of light to be emitted to the irradiation region that does not include the region where the target object is present. Accordingly, even if the unwanted reflected light due to the surrounding environment enters the light receiving unit in addition to the direct reflected light, the unwanted reflected light component can be removed.

According to the present disclosure, even if the unwanted reflected light due to the surrounding environment enters the light receiving unit in addition to the direct reflected light, the unwanted reflected light component can be removed, and ranging calculation can be performed by using only the direct reflected light component from the target object. Accordingly, accurate three-dimensional measurement of the target object can be implemented regardless of the surrounding environment.

BRIEF DESCRIPTION OF THE DRAWINGS

FIG. 2A is a timing chart of a light emission control signal and an exposure control signal, FIG. 2B is an enlarged view showing the exposure amount in a UG period, and FIG. 2C is an enlarged view showing the exposure amount in a G period.

FIG. 3A is a timing chart of the light emission control signal and the exposure control signal, FIG. 3B is an enlarged view showing the exposure amount in the UG period in the case where there is unwanted reflected light, and FIG. 3C is an enlarged view showing the exposure amount in the G period in the case where there is unwanted reflected light.

FIG. 7A is an enlarged view showing the exposure amount in the UG period for the radiation pattern B, and FIG. 7B is an enlarged view showing the exposure amount in the G period for the radiation pattern B.

FIGS. 12A-12C show an example of how to control the amount of light by using a detection region signal.

DETAILED DESCRIPTION

First Embodiment

Figure 1:
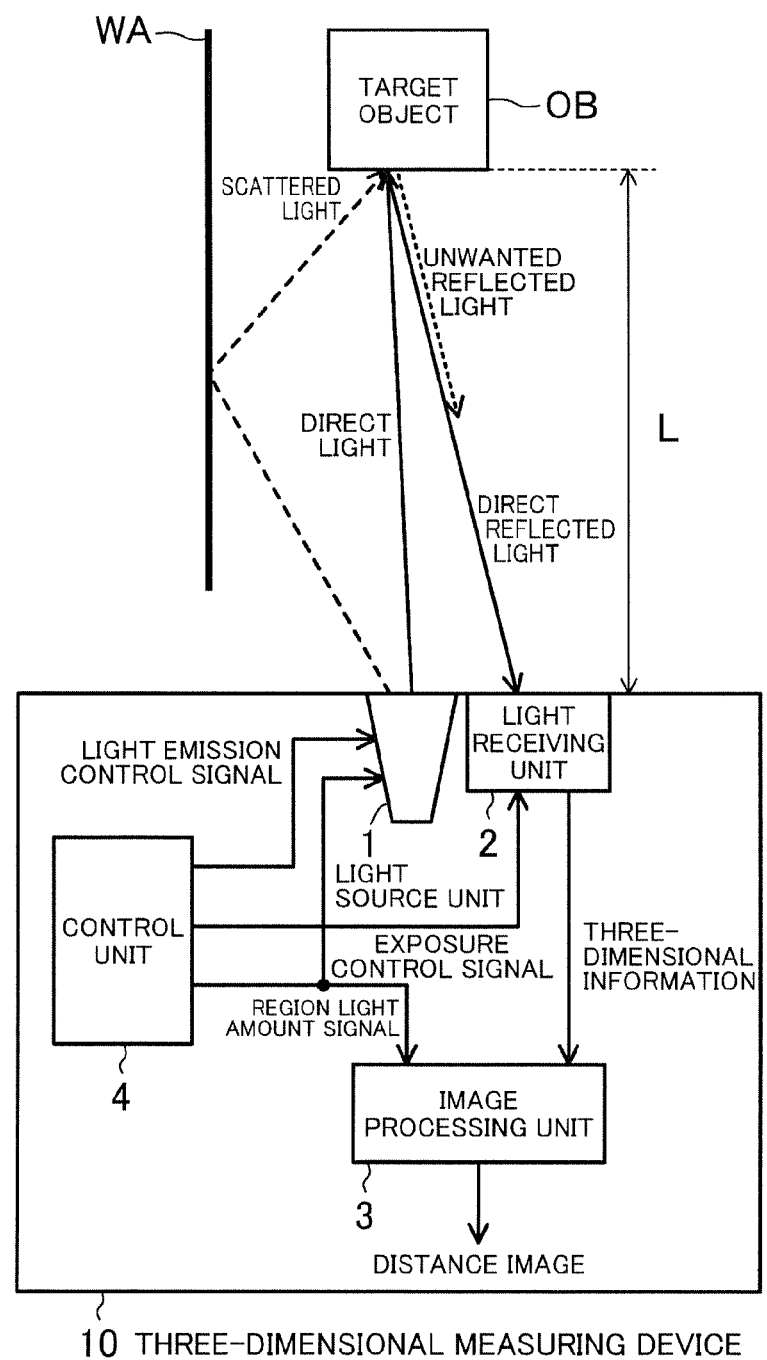
FIG. 1 is a diagram showing the configuration of a three-dimensional measuring device according to a first embodiment.

FIG. 1 is a diagram showing the configuration of a three-dimensional measuring device according to a first embodiment. A three-dimensional measuring device 10 of FIG. 1 uses a time of flight (TOF) method, and includes a light source unit 1, a light receiving unit 2, an image processing unit 3, and a control unit 4.

The light source unit 1 emits light toward a target object OB at the timing indicated by a light emission control signal. The light receiving unit 2 is exposed to light from a region including the target object OB at the timing indicated by an exposure control signal, photoelectrically converts the total exposure amount in the exposure period by an imaging area sensor, and outputs the resultant signal as three-dimensional information. The imaging area sensor of the light receiving unit 2 may be a CCD sensor or a CMOS sensor. The image processing unit 3 generates a distance image based on the three-dimensional information received from the light receiving unit 2 and outputs the distance image. The control unit 4 outputs the light emission control signal and the exposure control signal.

The light emission control signal and the exposure control signal are binary digital signals having "H (High)" and "L (Low)" levels. The light source unit 1 emits light when the light emission control signal is at "H" level, and the light receiving unit 2 is exposed to light during an "H" level period of the exposure control signal. The light source unit 1 does not emit light when the light emission control signal is at "L" level, and the light receiving unit 2 is not exposed to light when the exposure control signal is at "L" level.

The light source unit 1 can adjust for each of at least two irradiation regions the amount of light to be emitted. The control unit 4 outputs a region light amount signal indicating a radiation pattern as setting of the amount of light to be emitted to each irradiation region. The light source unit 1 receives the region light amount signal and emits light according to the radiation pattern indicated by the region light amount signal. The region light amount signal is applied also to the image processing unit 3.

For example, the light source unit 1 may vary the amount of light for each irradiation region by switching between or among a plurality of light sources corresponding to the respective irradiation regions. Alternatively, the light source unit 1 may control the amount of light for each irradiation region by using liquid crystal like in a projector, or may implement a variable irradiation range by changing the position of a lens located in front of the light sources. Alternatively, the plurality of light sources may be provided with a filter corresponding to the radiation pattern, and the light source unit 1 may switch between or among the light sources to emit light.

First, basic operation of the three-dimensional measuring device according to the present embodiment, namely a method for calculating the distance L to the target object OB, will be described with reference to the timing charts of FIGS. 2A-2C. FIG. 2A shows an example of the light emission control signal and the exposure control signal which are output from the control unit 4. FIG. 2B is an enlarged view showing the exposure amount in a UG period. FIG. 2C is an enlarged view showing the exposure amount in a G period. In FIGS. 2A-2C, the light receiving unit 2 receives only direct reflected light.

In the UG period, the light receiving unit 2 is exposed to light at such timing that all of the direct reflected light as reflection of the light emitted from the light source unit 1 is included. In the G period, the light receiving unit 2 is exposed to light such that the exposure amount decreases with an increase in delay of the direct reflected light with respect to the timing of light emission. In a BG period, the light source unit 1 does not emit light, and exposure control is performed under the same conditions as in the UG period and the G period, so that the light receiving unit 2 is exposed to background light other than the direct reflected light.

The distance L can be calculated by the following equation (1).

$$L = \frac{c \cdot T_0}{2} \times \left(1 - \frac{G - BG}{UG - BG}\right) \quad (1)$$

In the equation, "UG" represents the exposure amount of the direct reflected light in the UG period, "G" represents the exposure amount of the direct reflected light in the G period, "BG" represents the exposure amount of the background light in the BG period, "$T_0$" represents the pulse width of emitted direct light, and "c" represents the speed of light (299,792,458 m/s). For simplicity, the distance L can be given by the following equation (2) in the case where there is no background light, namely BG=0.

$$L = \frac{c \cdot T_0}{2} \times \left(1 - \frac{G}{UG}\right) \quad (2)$$

In fact, however, unwanted reflected light other than the direct reflected light may enter the light receiving unit 2. For example, the unwanted reflected light is the light scattered by the surrounding environment such as a wall WA and reflected by the target object OB, as shown in FIG. 1. FIGS. 3A-3C show the case where there is the unwanted reflected light. FIG. 3A shows an example of the light emission control signal and the exposure control signal which are output from the control unit 4 (same as FIG. 2A), FIG. 3B is an enlarged view showing the exposure amount in the UG period, and FIG. 3C is an enlarged view showing the exposure amount in the G period. As shown in FIGS. 3B-3C, the exposure amount is increased by the unwanted reflected light.

The total exposure amount in the UG period is (UG+ur), and the total exposure amount in the G period is (G+gr), where "ur" represents the exposure amount of the unwanted reflected light in the UG period, and "gr" represents the exposure amount of the unwanted reflected light in the G period. The distance L is given by the following equation (3) based on these values and the equation (2).

$$L = \frac{c \cdot T_0}{2} \times \left(1 - \frac{G+gr}{UG+ur}\right) \quad (3)$$

Since "gr/ur" varies depending on the surrounding environment, calculation of the distance L based on the equation (3) results in a measurement error.

The present embodiment therefore uses the region light amount signal that indicates the radiation pattern as setting of the amount of light to be emitted to each irradiation region. The light source unit 1 sets the amount of light to be emitted to each irradiation region and emits light according to the radiation pattern indicated by the region light amount signal received from the control unit 4. The image processing unit 3 eliminates the influence of the unwanted reflected light component based on the relation between the radiation pattern indicated by the region light amount signal and the three-dimensional information produced when light is emitted according to the radiation pattern.

Figure 4A:
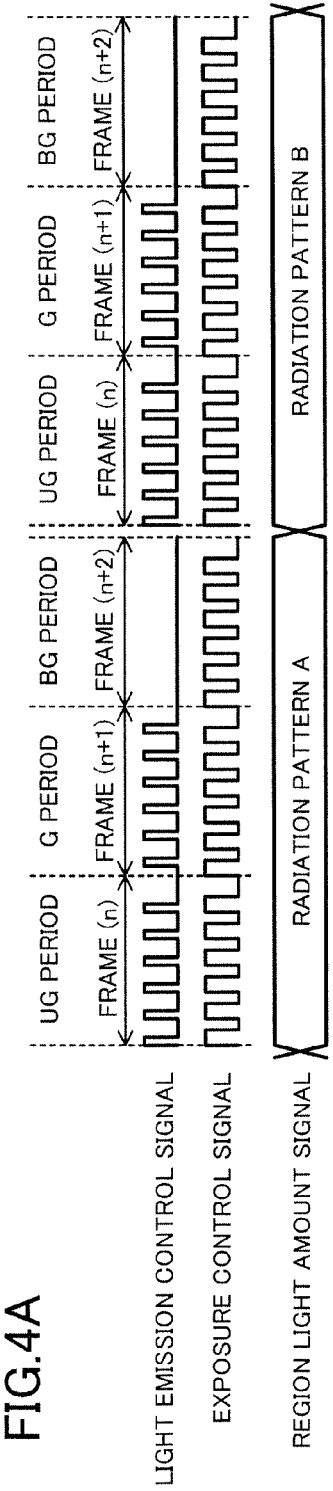
FIG. 4A is a timing chart of the light emission control signal, the exposure control signal, and a region light amount signal.
Figure 4B:
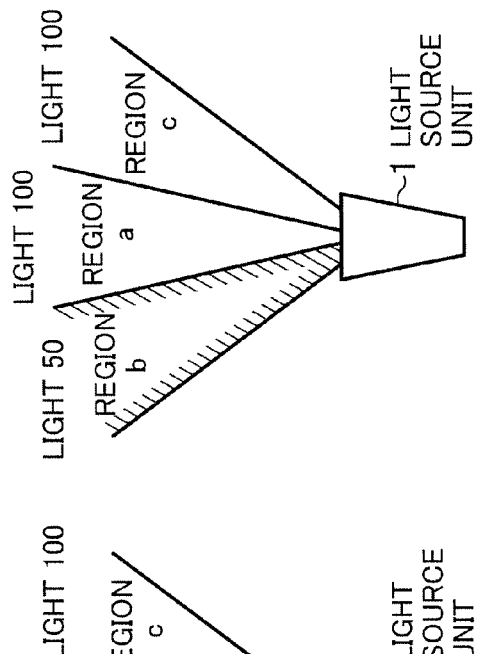
FIG. 4B shows an example of a radiation pattern A.
Figure 4C:
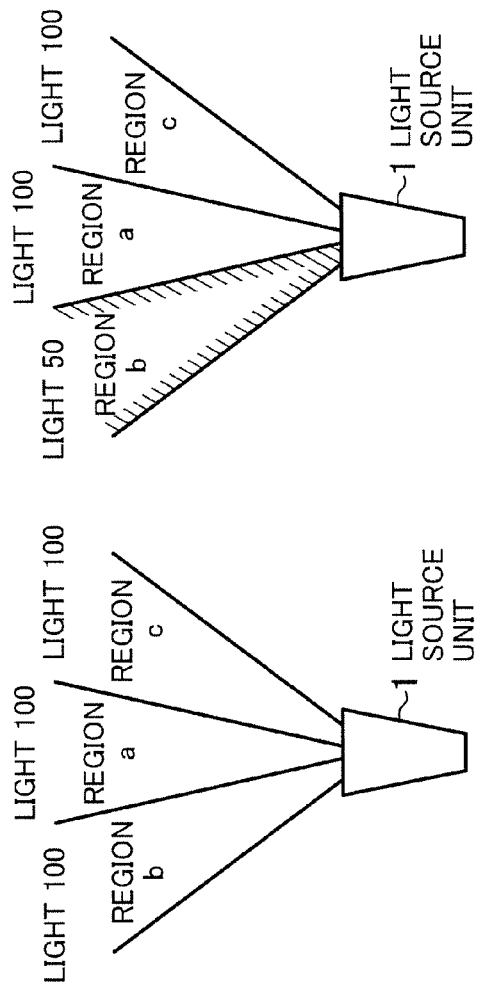
FIG. 4C shows an example of a radiation pattern B.

FIGS. 4A-4C are diagrams showing an example of the radiation pattern. FIG. 4A shows an example of the light emission control signal, the exposure control signal, and the region light amount signal. FIG. 4B shows an example of a radiation pattern A, and FIG. 4C shows an example of a radiation pattern B. In the example of FIGS. 4A-4C, the light source unit 1 can adjust for each of three irradiation regions a, b, c the amount of light to be emitted, and the region light amount signal shows the radiation patterns A, B in chronological order. In the radiation pattern A, the amount of light is set to 100 as a predetermined basic amount of light for all of the irradiation regions a, b, c. In the radiation pattern B, the amount of light is set to 100 for the irradiation regions a, c, and is set to 50 for the irradiation region b.

Figure 5:
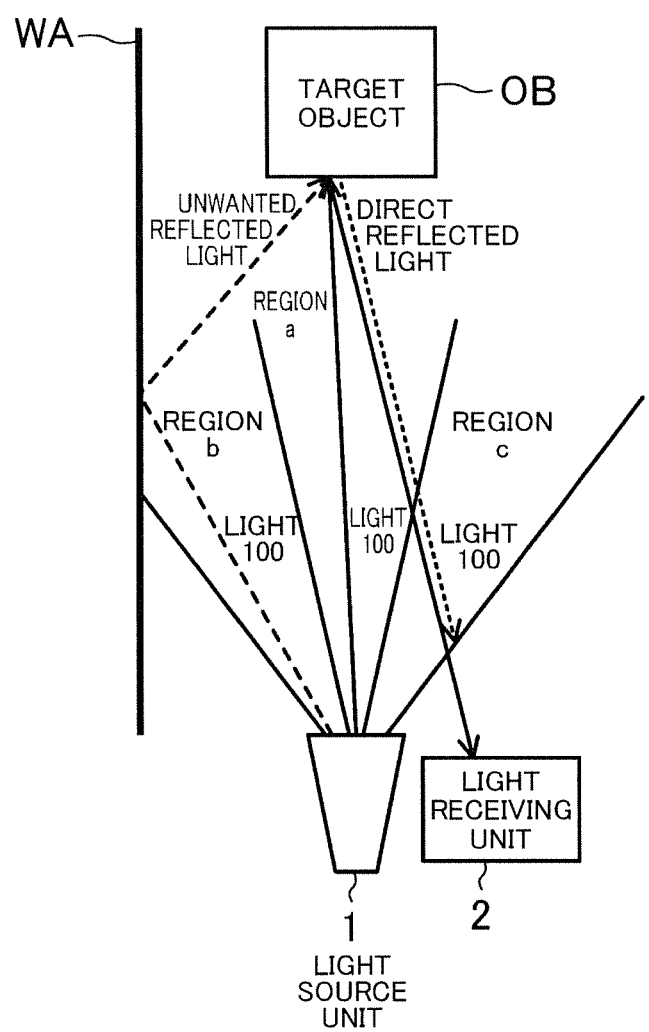
FIG. 5 is a diagram showing operation for the radiation pattern A.

FIG. 5 is a diagram showing operation in the case where light is emitted in the radiation pattern A. As shown in FIG. 5, the light source unit 1 emits the amount of light 100 to each of the irradiation regions a, b, c. In this case, the exposure amount in the light receiving unit 2 is as shown in FIGS. 3B-3C. Namely, the total exposure amount in the UG period is "(UG+ur)," and the total exposure amount in the G period is "(G+gr)."

Figure 6:
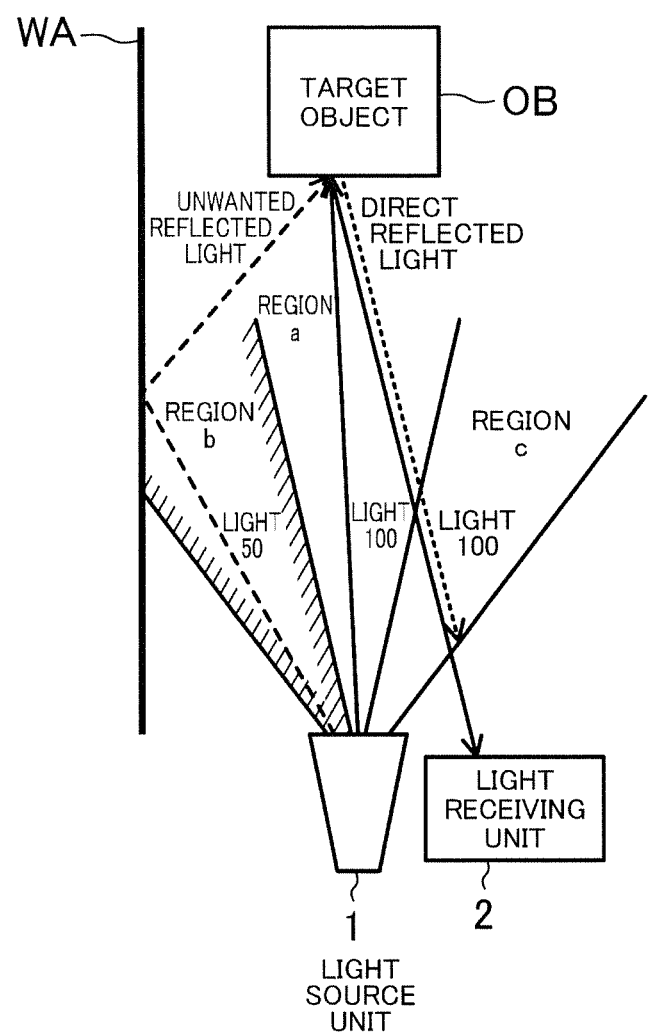
FIG. 6 is a diagram showing operation for the radiation pattern B.

FIG. 6 is a diagram showing operation in the case where light is emitted in the radiation pattern B. As shown in FIG. 6, the light source unit 1 emits the amount of light 100 to the irradiation regions a, c and emits the amount of light 50 to the irradiation region b. In this case, the exposure amount in the light receiving unit 2 is as shown in FIGS. 7A-7B. Since the exposure amount of the unwanted reflected light is half that in the case of the radiation pattern A, the total exposure amount in the UG period is "(UG+ur/2)," and the total exposure amount in the G period is "(G+gr/2)."

The difference in total exposure amount in the UG period between the radiation pattern A and the radiation pattern B is therefore "(UG+ur)−(UG+ur/2)=ur/2." The unwanted reflected light component "ur/2" entering the light receiving unit 2 in the UG period of the radiation pattern B can thus be calculated. The unwanted reflected light component "ur" entering the light receiving unit 2 in the UG period of the radiation pattern A can be calculated by doubling "ur/2."

Similarly, the difference in total exposure amount in the G period between the radiation pattern A and the radiation pattern B is "(G+gr)−(G+gr/2)=gr/2." The unwanted reflected light component "gr/2" entering the light receiving unit 2 in the G period of the radiation pattern B can thus be calculated. The unwanted reflected light component "gr" entering the light receiving unit 2 in the G period of the radiation pattern A can be calculated by doubling "gr/2."

For example, in the case of emitting light in the radiation pattern A, the exposure amounts "UG," "G" without the influence of the unwanted reflected light are obtained by subtracting "ur" calculated as described above from the total exposure amount in the UG period "(UG+ur)" and subtracting "gr" calculated as described above from the total exposure amount in the G period "(G+gr)." The distance L with no measurement error due to the unwanted reflected light can thus be calculated by using, e.g., the equation (2). Similarly, in the case of emitting light in the radiation pattern B, the exposure amounts "UG," "G" without the influence of the unwanted reflected light are obtained by subtracting "ur/2" calculated as described above from the total exposure amount in the UG period "(UG+ur/2)" and subtracting "gr/2" calculated as described above from the total exposure amount in the G period "(G+gr/2)." The distance L with no measurement error due to the unwanted reflected light can thus be calculated by using, e.g., the equation (2).

As described above, according to the present embodiment, the light source unit 1 is controlled to vary the amount of light for each irradiation region. Based on the information on the radiation pattern and the three-dimensional information according to the radiation pattern, the image processing unit 3 calculates the exposure amount of the unwanted reflected light from the irradiation region for which the amount of light has been varied. The unwanted reflected light in the G period and the UG period can thus be removed, and accurate three-dimensional measurement can be carried out regardless of the surrounding environment.

The amount of light for the irradiation region b (the irradiation region for which the amount of light has been varied) may be controlled to decrease in both radiation patterns A, B if the calculated unwanted reflected light "gr," "ur" is larger than a predetermined value. That is, if the calculated unwanted reflected light component "gr," "ur" is larger than the predetermined value, the image processing unit 3 may send the control unit 4 a command to reduce the amount of light for the irradiation region b in the radiation patterns A, B. This can suppress optical shot noise due to the unwanted reflected light and can suppress reduction in dynamic range.

Figure 8A:
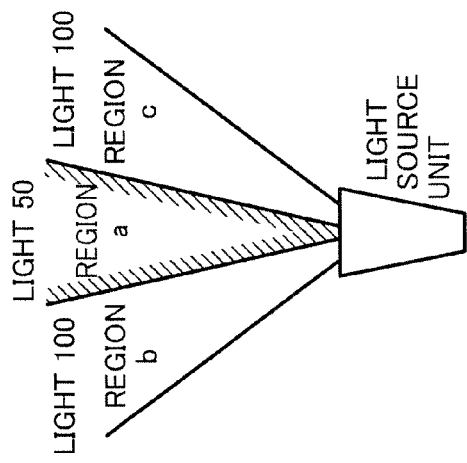
FIG. 8A shows an example of a radiation pattern C.
Figure 8B:
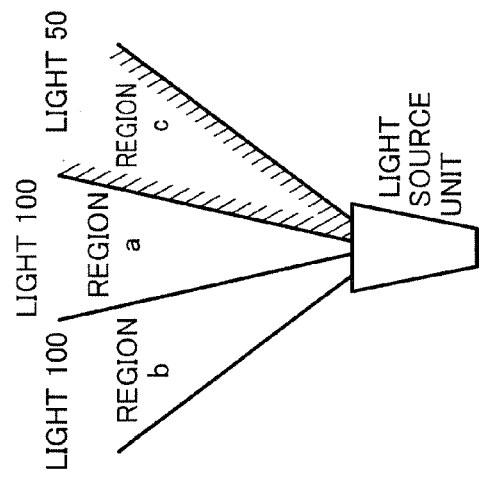
FIG. 8B shows an example of a radiation pattern D.
Figure 8C:
FIG. 8C shows an example of a region light amount signal.

In the present embodiment, the amount of light is varied only for the irradiation region b in the radiation patterns A, B. However, the types of radiation patterns are not limited to these. For example, a radiation pattern C in which the amount of light for the irradiation region c is reduced and a radiation pattern D in which the amount of light for the irradiation region a is reduced as shown in FIGS. 8A-8B may be prepared in addition to the radiation patterns A, B, and the radiation patterns A, B, C, D may be used in chronological order as shown in FIG. 8C.

Light may be sequentially emitted in the following order: at least two radiation patterns A, the radiation pattern B, and at least two radiation patterns A. In this case, the exposure amount of the unwanted reflected light calculated by using the radiation pattern B may be retained, and during light emission in the at least two radiation patterns A, the three-dimensional information may be corrected by using the retained exposure amount of the unwanted reflected light.

Although the amount of light for each irradiation region is switched between "100" and "50" in the present embodiment, the present disclosure is not limited to this. For example, the amount of light for each irradiation region may be switched between "80" and "20" or between "100" and "0."

Figure 9B:
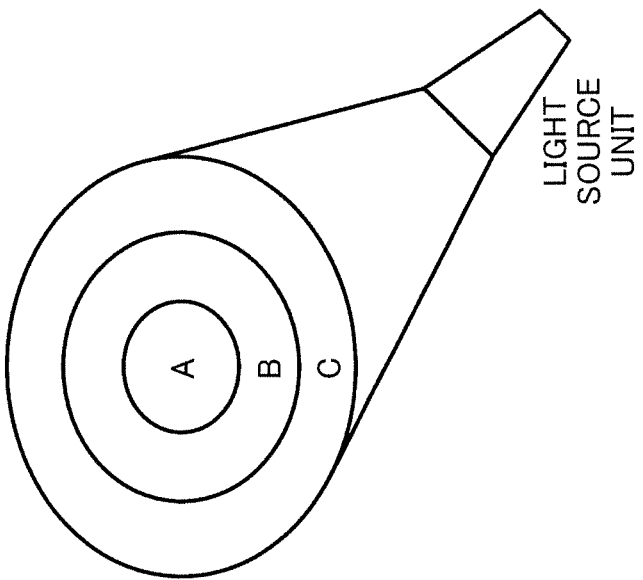
FIGS. 9A-9B show other examples of radiation patterns.
Figure 9A:
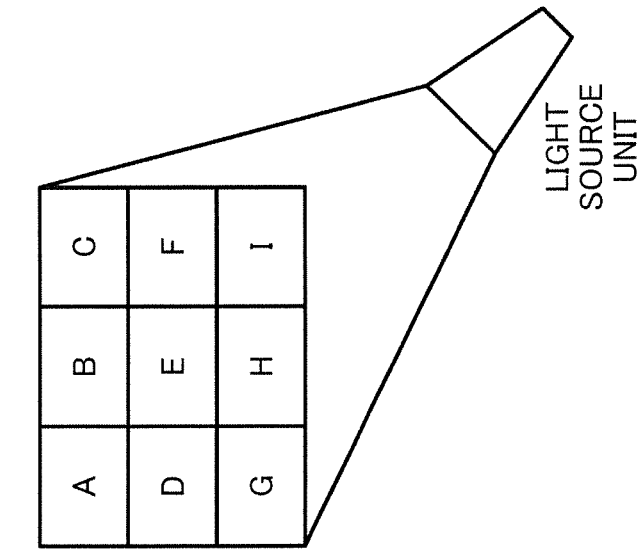

In the present embodiment, the irradiation range is divided into the three irradiation regions a, b, c in one direction. However, the number of irradiation regions and the manner in which the irradiation range is divided are not limited to this. For example, a plurality of irradiation regions may be set in a grid pattern as shown in FIG. 9A, or a plurality of irradiation regions may be set in a concentric pattern as shown in FIG. 9B.

Figure 10:
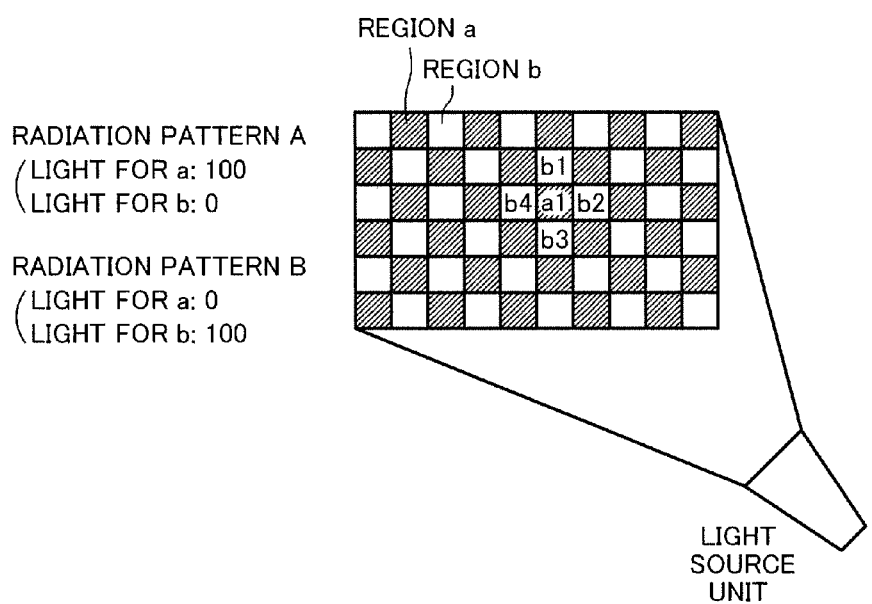
FIG. 10 shows a further example of radiation pattern.

As shown in FIG. 10, the irradiation range may be divided into very small regions a, b arranged in a checkboard pattern, and a radiation pattern A in which the amount of light is 100 for the regions a and 0 for the regions b and a radiation pattern B in which the amount of light is 0 for the regions a and 100 for the regions b may be used. In this case, for example, the unwanted reflected light component included in the three-dimensional information corresponding to the irradiation region a1 with the amount of light 100 may be corrected based on the three-dimensional information corresponding to the surrounding regions b1, b2, b3, b4 with the amount of light 0 (since the amount of light is 0 in these surrounding regions, the total exposure amount is comprised of only the unwanted reflected light component).

Second Embodiment

Figure 11:
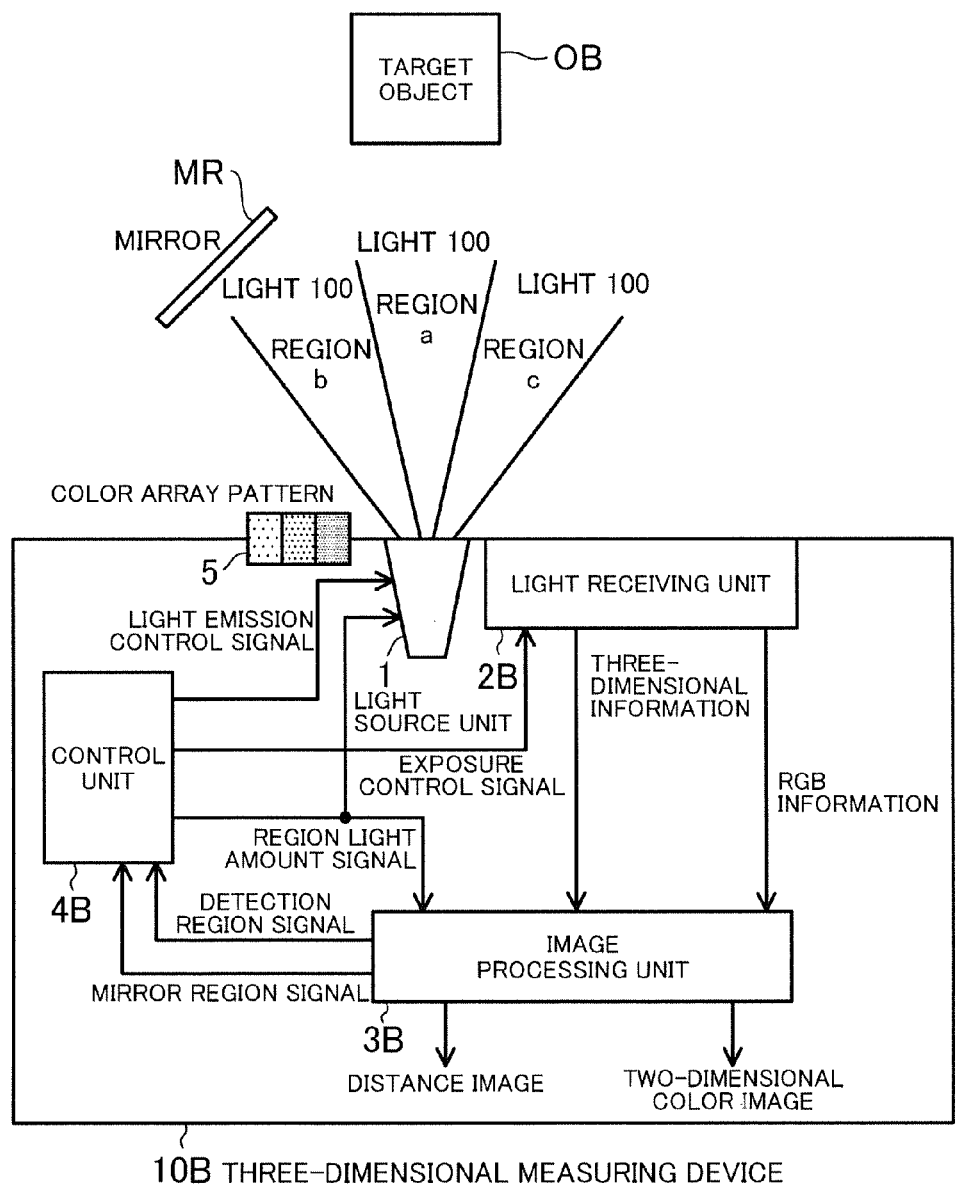
FIG. 11 is a diagram showing the configuration of a three-dimensional measuring device according to a second embodiment.

FIG. 11 is a diagram showing the configuration of a three-dimensional measuring device according to a second embodiment. The configuration of a three-dimensional measuring device 10B of FIG. 1I is substantially similar to that of the three-dimensional measuring device 10 of the first embodiment. The three-dimensional measuring device 10B is different from the three-dimensional measuring device 10 in that the three-dimensional measuring device 10B has a predetermined color array pattern 5 provided on its surface located on the light-emitting side of the light source unit 1. The color array pattern 5 is used to recognize if there is a mirror. A light receiving unit 2B can produce two-dimensional RGB information in addition to three-dimensional information. The light receiving unit 2B sends the three-dimensional information and the RGB information to an image processing unit 3B. The image processing unit 3B generates a two-dimensional color image in addition to a distance image based on the three-dimensional information and RGB information received from the light receiving unit 2B, and outputs the two-dimensional color image. The image processing unit 3B further has a function to generate a detection region signal indicating a region where a target object OB is present and a mirror region signal indicating a region where a mirror MR is present. The image processing unit 3B sends the detection region signal and the mirror region signal to a control unit 4B.

The light source unit 1 operates in a manner similar to that in the first embodiment. The light receiving unit 2B is exposed to direct reflected light from the target object OB only during an "H" level period of an exposure control signal, and outputs as the three-dimensional information a signal generated by photoelectric conversion by an imaging area sensor. The light receiving unit 2B is exposed to light associated with color information at the same timing or close to the same timing as the timing the light receiving unit 2B is exposed to the reflected light, and outputs as the RGB information a signal generated by photoelectric conversion by the imaging area sensor.

The image processing unit 3B performs pattern recognition of a target (e.g., a hand or face) of the target object OB in the RGB information as two-dimensional color information as shown in FIG. 12A. If the RGB information matches the target, the image processing unit 3B detects a region where the target is present from the positions of the pixels recognized as the target, and outputs a detection region signal indicating the detected region. The control unit 4B receives the detection region signal and sets a region light amount signal so as to reduce the amount of light for each irradiation region that does not include the detected region where the target object OB is present, as shown in FIG. 12B. FIG. 12C shows an example of a radiation pattern that is used in this case. In this radiation pattern, the amount of light is reduced for irradiation regions b, c other than an irradiation region a where the target object OB has been detected.

Figure 13A:
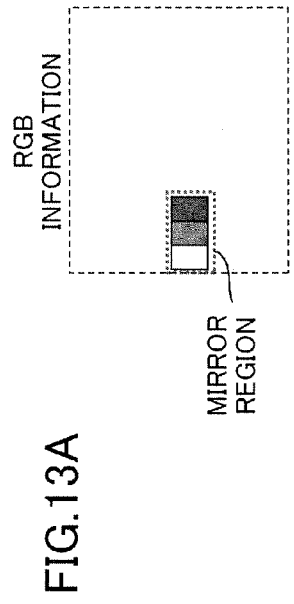
FIGS. 13A-13C show an example of how to control the amount of light by using a mirror region signal.
Figure 13B:
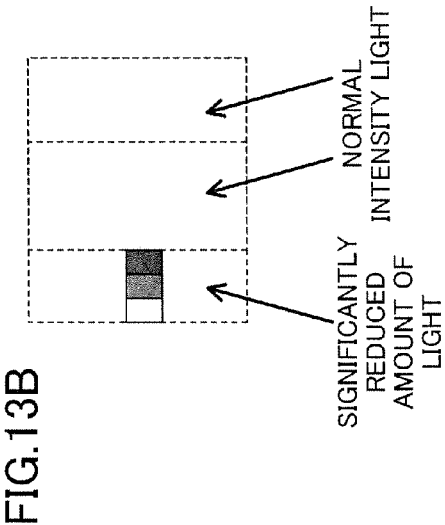
Figure 13C:
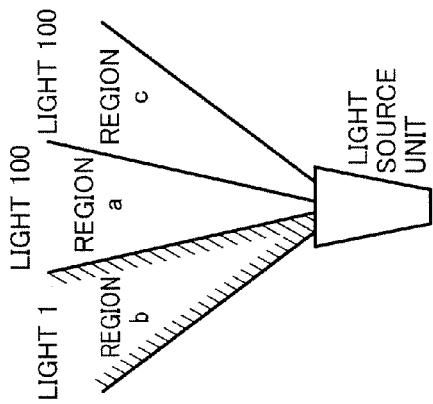

As shown in FIG. 13A, the image processing unit 3B performs pattern recognition of the color array pattern 5 in the RGB information. If the RGB information matches the color array pattern 5, the image processing unit 3B recognizes that there is a mirror, detects a region where the mirror is present from the positions of the pixels recognized as the mirror, and outputs a mirror region signal indicating the detected region. The control unit 4B receives the mirror region signal and reduces the amount of light for the irradiation region including the region where the mirror is present, as shown in FIG. 13B. FIG. 13C shows an example of a radiation pattern that is used in this case. In this radiation pattern, the amount of light is significantly reduced for the irradiation region b where the mirror MR has been detected.

Regarding the distance image of the region recognized as the mirror, the image processing unit 3B may calculate the distance to the mirror MR from the size of the mirror region in the plane represented by the RGB information. That is, according to the present embodiment, the distance to the mirror MR can also be measured in the system using the TOF method.

As described above, according to the present embodiment, the three-dimensional measuring device recognizes the irradiation region where the target object is present and reduces the amount of light for each irradiation region other than the recognized irradiation region. This can suppress the influence of the unwanted reflected light on the target object and can implement accurate ranging. Since the distance L is calculated based on the ratio of G to UG as given by the equation (2), ranging in each irradiation region with the reduced amount of light can be performed although accuracy is somewhat reduced.

If the target object is an object having high reflectance and having a smooth surface like a mirror, it is difficult to measure the distance to the target object by the TOF method. In the present embodiment, the distance to an object like a mirror that does not reflect emitted light to the light receiving unit can also be measured by using a known color array and RGB information in addition to three-dimensional information of the TOF method.

In the case where a target has low reflectance or the distance to the target is long based on the three-dimensional information of a region including the target, the control unit 4B may output a region light amount signal so as to increase the amount of light for the irradiation region corresponding to the region including the target.

The color array pattern 5 is not limited to the color array and may be a unique pattern having different reflectance values of near infrared light etc., a unique self-luminous color array pattern, or a unique light-emitting pattern. The color array pattern 5 need not necessarily have a rectangular shape. For example, the color array pattern 5 may have a circular or spherical shape.

The three-dimensional measuring device 10B or the color array pattern 5 may additionally have a mobile function in order to recognize the region of the entire mirror.

The inclination of the mirror may be calculated from the aspect ratio of the color array pattern. The image processing unit 3B may not output a mirror region signal if reflected light from the mirror does not affect a target object, if the distance to the mirror is long, etc.

In the present embodiment, the image processing unit 3B may output a detection signal to the control unit 4B if there is a region in the distance image where the distance is equal to or smaller than a predetermined value. The control unit 4B may set a region light amount signal so as to set the amount of light for each irradiation region to a prescribed basic amount of light when it receives the detection signal and to set the amount of light for at least one irradiation region to a value smaller than the predetermined basic amount of light when it does not receive the detection signal. In this case, the amount of light for the at least one irradiation region may be set to zero.

For example, in the case where the irradiation regions are set as shown in FIG. 9A, the light source unit 1 emits low intensity light only to the region G and does not emit light to the other regions when the control unit 4B is in a sleep mode. The image processing unit 3B outputs a detection signal if it detects in the distance image corresponding to the region G a target object located at a distance smaller than a predetermined threshold value. In response to the detection signal, the control unit 4B may be switched to an active mode and output a region light amount signal so as to increase the amount of light for all the regions A to I.

In the present disclosure, accurate three-dimensional measurement of a target object can be implemented regardless of the surrounding environment. The present disclose is therefore effective in improving accuracy of three-dimensional measurement of, e.g., a person, a building, etc.

What is claimed is:

1. A three-dimensional measuring device using a time of flight (TOF) method, comprising:
   a light source unit configured to emit light at timing indicated by a light emission control signal and to be able to adjust for each of at least two irradiation regions an amount of light to be emitted;
   a light receiving unit configured to be exposed to light from a region including a target object at timing indicated by an exposure control signal and to produce three-dimensional information from a total exposure amount;
   an image processing unit configured to generate a distance image based on the three-dimensional information received from the light receiving unit; and
   a control unit configured to output the light emission control signal, the exposure control signal, and a region light amount signal indicating a radiation pattern as setting of the amount of light to be emitted to each of the irradiation regions, wherein
   the light source unit emits light according to the radiation pattern indicated by the region light amount signal, and
   the control unit outputs as the region light amount signal a signal that shows in chronological order a first radiation pattern in which the amount of light to be emitted to each of the irradiation regions is set to a predetermined basic amount of light, and a second radiation pattern in which the amount of light to be emitted to a first irradiation region as at least one of the irradiation regions is different from the predetermined basic amount of light.

2. The three-dimensional measuring device of claim 1, wherein the second radiation pattern includes two or more kinds of radiation patterns that are different from each other.

3. The three-dimensional measuring device of claim 1, wherein the image processing unit calculates a reflected light component of the amount of light emitted to the first irradiation region from the three-dimensional information according to the first radiation pattern and the three-dimensional information according to the second radiation pattern, and corrects the three-dimensional information by using the reflected light component.

4. The three-dimensional measuring device of claim 3, wherein when the calculated reflected light component is larger than a predetermined value, the image processing unit sends the control unit a command to reduce the amount of light for the first irradiation region in the first and second radiation patterns.

5. The three-dimensional measuring device of claim 1, wherein
   the light receiving unit produces two-dimensional RGB information in addition to the three-dimensional information, and
   the image processing unit generates the distance image and a two-dimensional color image based on the three-dimensional information and the RGB information which are received from the light receiving unit.

6. The three-dimensional measuring device of claim 5, wherein
   the image processing unit detects a region where the target object is present from the RGB information and outputs a detection region signal indicating the detected region, and
   the control unit receives the detection region signal and sets the region light amount signal so as to reduce the amount of light for the irradiation region that does not include the region indicated by the detection region signal.

7. The three-dimensional measuring device of claim 1, wherein
   the image processing unit outputs a detection signal to the control unit if there is a region in the distance image where a distance is equal to or smaller than a predetermined value, and
   the control unit sets the region light amount signal so as to set the amount of light for each of the irradiation regions to a prescribed basic amount of light when it receives the detection signal and to set the amount of light for at least one of the irradiation regions to a value smaller than the predetermined basic amount of light when it does not receive the detection signal.

8. The three-dimensional measuring device of claim 7, wherein the control unit sets the amount of light for the at least one of the irradiation regions to zero when it does not receive the detection signal.

9. A three-dimensional measuring device using a time of flight (TOF) method, comprising:
- a light source unit configured to emit light at timing indicated by a light emission control signal and to be able to adjust for each of at least two irradiation regions an amount of light to be emitted;
- a light receiving unit configured to be exposed to light from a region including a target object at timing indicated by an exposure control signal and to produce three-dimensional information from a total exposure amount;
- an image processing unit configured to generate a distance image based on the three-dimensional information received from the light receiving unit; and
- a control unit configured to output the light emission control signal, the exposure control signal, and a region light amount signal indicating a radiation pattern as setting of the amount of light to be emitted to each of the irradiation regions, wherein the light source unit emits light according to the radiation pattern indicated by the region light amount signal, the light receiving unit produces two-dimensional RGB information in addition to the three-dimensional information, the image processing unit generates the distance image and a two-dimensional color image based on the three-dimensional information and the RGB information which are received from the light receiving unit, the three-dimensional measuring device has a predetermined color array pattern on its surface located on a light emitting side, the image processing unit recognizes that there is a mirror from the RGB information by performing pattern recognition of the color array pattern and outputs a mirror region signal indicating a region where the mirror is present, and the control unit receives the mirror region signal and sets the region light amount signal so as to reduce the amount of light for the irradiation region that includes the region indicated by the mirror region signal.

10. The three-dimensional measuring device of claim 9, wherein the image processing unit calculates a distance to the mirror from a size of the region where the mirror is present in a plane represented by the RGB information.

11. A three-dimensional measuring method using a time of flight (TOF) method, the method using
- a light source unit configured to emit light at timing indicated by a light emission control signal and to be able to adjust for each of at least two irradiation regions an amount of light to be emitted,
- a light receiving unit configured to be exposed to light from a region including a target object at timing indicated by an exposure control signal and to produce three-dimensional information from a total exposure amount, and
- an image processing unit configured to generate a distance image based on the three-dimensional information received from the light receiving unit, the method comprising steps of:
- by the light emitting unit, emitting light according to a first radiation pattern in which the amount of light to be emitted to each of the irradiation regions is set to a predetermined basic amount of light;
- by the light emitting unit, emitting light according to a second radiation pattern in which the amount of light to be emitted to a first irradiation region as at least one of the irradiation regions is different from the predetermined basic amount of light; and
- by the image processing unit, calculating a reflected light component of the amount of light emitted to the first irradiation region from the three-dimensional information according to the first radiation pattern and the three-dimensional information according to the second radiation pattern which are received from the light receiving unit, and correcting the three-dimensional information by using the reflected light component.

* * * * *